United States Patent [19]

Tiggelbeck et al.

[11] Patent Number: 5,187,131
[45] Date of Patent: Feb. 16, 1993

[54] METHOD FOR REGENERATING PARTICULATE ADSORBENTS

[75] Inventors: Donald D. Tiggelbeck, Pittsburgh; George M. Goyak, Murrysville, both of Pa.

[73] Assignee: Tigg Corporation, Pittsburgh, Pa.

[21] Appl. No.: 759,882

[22] Filed: Sep. 13, 1991

Related U.S. Application Data

[63] Continuation-in-part of Ser. No. 464,550, Jan. 16, 1990, abandoned.

[51] Int. Cl.$^5$ .................... B01J 20/34; B01J 38/04; B01J 37/34; B01D 51/06
[52] U.S. Cl. .......................... 502/34; 62/18; 55/58; 55/59; 55/71; 210/694; 502/5; 502/56; 568/411; 570/179
[58] Field of Search ................. 502/5, 34, 56

[56] References Cited

U.S. PATENT DOCUMENTS

| | | | |
|---|---|---|---|
| 3,634,028 | 1/1972 | Hohne | 502/34 |
| 4,421,651 | 12/1983 | Burkholder et al. | 502/56 |
| 4,717,697 | 1/1988 | Kunugiza et al. | 502/56 |
| 5,069,038 | 12/1991 | Peinze | 502/34 |

FOREIGN PATENT DOCUMENTS

| | | | |
|---|---|---|---|
| 152994 | 12/1975 | Japan | 502/5 |
| 207547 | 3/1924 | United Kingdom | 502/5 |
| 285480 | 2/1928 | United Kingdom | 502/56 |

Primary Examiner—Paul E. Konopka
Attorney, Agent, or Firm—Harry B. Keck

[57] ABSTRACT

Method and apparatus for in-situ regeneration of particulate adsorbent in a vessel including: heating the adsorbent, passing inert gas through heated absorbent to collect vaporized adsorbate, chilling the inert gas to condense adsorbate, thereafter lowering the pressure within the vessel, collecting withdrawn gases containing volatilized adsorbate, and chilling the withdrawn gases to condense adsorbate.

8 Claims, 5 Drawing Sheets

METHOD FOR REGENERATING PARTICULATE ADSORBENTS

CROSS REFERENCE TO RELATED APPLICATIONS

This application is a continuation-in-part of our corresponding U.S. patent application Ser. No. 07/464,550, filed Jan. 16, 1990, now abandoned.

BACKGROUND OF THE INVENTION

1. FIELD OF THE INVENTION

This invention concerns an improved method for regenerating particulate adsorbent and particularly for regenerating activated carbon adsorbent.

2. STATEMENT OF THE PRIOR ART

Activated carbon is a widely-used adsorbent for removing organic contaminants from gas streams and liquid streams, hereinafter referred to collectively as fluid streams. Activated carbon is particularly useful for removing organic contaminants from fluid streams in which the organic contaminants constitute a minor portion (less than 1%) of a fluid stream. For example: removing paint solvents from ventilation gases exhausted from paint spray operations; recovering gasoline vapors from air; removing cooking odor-causing ingredients from exhaust gases from kitchens; recovering printing ink solvents from exhaust gases of printing plants; recovering fugitive organic contaminants from the exhaust air at tank farms and transfer pumps in distribution terminals; removing organic contaminants from the exhaust gases at coating and calendering shops. Other particulate adsorbents are silica gel, activated alumina and molecular sieves.

All of these clean-up treatments involve a gas (usually air) stream containing varying amounts, but often less than one percent by volume of the organic contaminant. The contaminated gas stream is delivered through a bed of activated carbon which adsorbs the organic contaminant. The treated gas (usually air) normally can be discharged into the atmosphere or recycled as a stream containing less than the prescribed quantity of the contaminant. Many of the same types of organic materials can be removed from waste water or ground water with activated carbon.

While the expression "contaminant" is employed in this specification, there are instances in which the adsorbate is a valuable material to be recovered. The expression "contaminant" is intended to refer to the ingredient which is present in the fluid material in small quantities and is recovered on the activated carbon as the adsorbate.

Customarily the activated carbon is provided in several vessels which cycle through (a) a working stage (during which contaminants are adsorbed on the activated carbon) and (b) a regeneration stage (during which the adsorbed contaminants are removed from the activated carbon and the ability of the activated carbon to adsorb more contaminants is restored). If the service life of the activated carbon is sufficiently long, the spent activated carbon may be removed periodically for reactivation elsewhere, or perhaps discarded and replaced.

Virgin activated carbon is customarily provided as screened particles, usually ⅛ inch to ⅜ inch size, or as pellets of similar size. Activated carbon intended for use with liquids is usually smaller, e.g., 1.0 to 1.5 mm diameter. The virgin activated carbon has a large surface area per unit weight. This surface area is available for adsorbing organic contaminants. As the organic contaminants are adsorbed on the activated carbon, the remaining surface area available for further adsorption decreases and the effectiveness of the activated carbon is reduced. The spent activated carbon is regenerated or replaced when its effectiveness has reached a pre-determined minimum acceptable value. The minimum acceptable value will be determined by the requirements of the installation, e.g., the allowable contaminant content of the discharged gas.

There are several commercial regeneration procedures. In some installations the spent activated carbon is removed from the vessel and is replaced with virgin activated carbon or with off-site regenerated activated carbon or with a mixture of both. Replacement with virgin activated carbon is costly but may be justified if substantially total contaminant removal is required. Movement of the activated carbon off-site results in transportation costs, labor costs and particle abrasion and degradation, producing fines which must be screened from the regenerated activated carbon. Regeneration off-site is usually accomplished by heating the spent activated carbon in a furnace or kiln, with steam being introduced to create a suitable atmosphere. The regeneration gases burn some of the adsorbed contaminants, and also burn some of the activated carbon with the result that there is less activated carbon and, more importantly, the residual activated carbon commonly has a lower adsorption capacity and is a less efficient adsorbent than virgin activated carbon, and may be undesirably soft and dusty. There are also known in-situ regeneration procedures using steam and/or hot gases to devolatilize adsorbate.

Regeneration of activated carbon by means of vacuum procedures has been ineffective because the adsorbent volatilization requires thermal energy with the result that the carbon is chilled before significant desorption is achieved. The chilling effect of vacuum desorption cannot be offset because the vacuum environment is known to be an efficient thermal insulator; hence heat energy cannot be added to the chilled carbon during vacuum desorption.

Regeneration of activated carbon by means of vacuum procedures has been ineffective because the adsorbent volatilization requires thermal energy with the result that the carbon is chilled before significant desorption is achieved. The chilling effect of vacuum desorption cannot be offset because the vacuum environment is known to be an efficient thermal insulator; hence heat energy cannot be added to the chilled carbon during vacuum desorption.

According to the preferred embodiment of this invention, the regeneration is carried out in situ, i.e., in the same vessel, without removing the spent activated carbon. This preferred embodiment is particularly useful when the duty cycle of the units is short, e.g., 30 minutes to several weeks.

In general the regenerated activated carbon never achieves the adsorbing capacity and effectiveness of the virgin activated carbon because there is some residual adsorbate which resists separation from the activated carbon regardless of the regeneration procedure. This is especially common with in situ steam-regenerated activated carbon, where practical considerations usually demand that steaming the activated carbon be curtailed before the residual adsorbed substances (those in the highest adsorption energy portions of the adsorbent structure) are removed.

In many activated carbon treatment processes, the regenerated activated carbon has its effectiveness reduced to such a level that the system cannot satisfy demanding contaminant removal requirements in subsequent cycles, and thus regenerated activated carbon cannot meet the requirement at all or can meet the requirement for only uneconomically brief cycles.

STATEMENT OF THE PRESENT INVENTION

A novel apparatus and method for regenerating activated carbon employs a heating stage and a vacuum stage as essential stages in the regeneration process for activated carbon. First: A bed of spent activated carbon is heated in a vessel containing inert gas to increase the carbon temperature and cause substantial desorption of adsorbate through volatilization. A flow of inert gas (i.e., free of oxidants) is maintained through the bed of activated carbon during the heating stage to avoid combustion of the adsorbate and to avoid combustion of the activated carbon. The inert gas carries out the volatilized adsorbate for separate recovery. The inert gas containing volatilized adsorbate is chilled below the dew point of the adsorbate and the condensed adsorbate is recovered as a liquid phase from the chilled inert gas. Second: After a significant portion of the adsorbate is desorbed in the heating stage and the carbon is above 225° F., the vessel is sealed and evacuated to a pressure less than 0.001 Torr. The reduced pressure within the vessel causes further desorption as the vapor pressure of the adsorbate approaches or exceeds the reduced pressure within the vessel. The withdrawn evacuated gas, containing desorbed adsorbate, is chilled and the adsorbate is recovered as a liquid. During the second stage, the heated activated carbon becomes cooled as the adsorbate are desorbed and volatilized. Cooling results from the heat of vaporization required by volatilization of the adsorbate. Because reheating the bed with inert gas to supply latent heat is a relatively quick procedure, and repeated low pressure treatment of the bed is a relatively quick procedure, the desorption stages may be repeated if required by the nature of the adsorbate.

The resulting regenerated activated carbon is restored to a greater adsorbing capacity and efficiency than regenerated activated carbon obtained by other types of regeneration. Because the regenerated activated carbon has greater adsorbing efficiency, the system can satisfy more demanding adsorbate separation requirements. By using multiple parallel vessels containing activated carbon, it is feasible, with the present regeneration method, to maintain a high level of adsorption efficiency by regenerating the activated carbon before its adsorption efficiency is seriously diminished.

The adsorbate may be collected as a liquid for recovery or for disposal. Alternatively, a gas stream containing an increased concentration of the desorbed adsorbate may be withdrawn from the system for flaring or burning or other disposal or recovery as a gas stream.

The two-stage regeneration process also can be employed in off-site or mobile regeneration of spent activated carbon. Off-site or mobile regeneration can be considered when the duty cycle of the system is relatively long, e.g., from several days to several months.

The regeneration invention can be applied to processes for treating gas streams with activated carbon and also for treating liquid streams with activated carbon. The term "fluid" is employed in this specification and claims to indicate a gas or a liquid. With liquid treatment installations, the activated carbon should be dried before commencing regeneration.

The regeneration system is of especial interest with activated carbon as the adsorbent. However the method and operation are useful for regenerating other particulate adsorbents such as silica gel, activated alumina and molecular sieves.

Accordingly it is an object of this invention to provide a method for carrying out a two-stage regeneration of spent activated carbon.

It is a further object of this invention to regenerate activated carbon to a higher level adsorption efficiency than can be achieved by the in situ regeneration procedures of the prior art.

It is a further object of the invention to provide contaminant separation apparatus in which the contaminant adsorbent efficiency can be maintained at a high level.

Yet another object of the invention is to reduce or to eliminate unwanted by-products of the separation procedure, e.g., to eliminate contaminated steam condensate.

These and other objects and advantages of the present invention will become apparent in the following detailed discussion by reference to the drawings.

DESCRIPTION OF THE PREFERRED EMBODIMENTS

Figure 1:
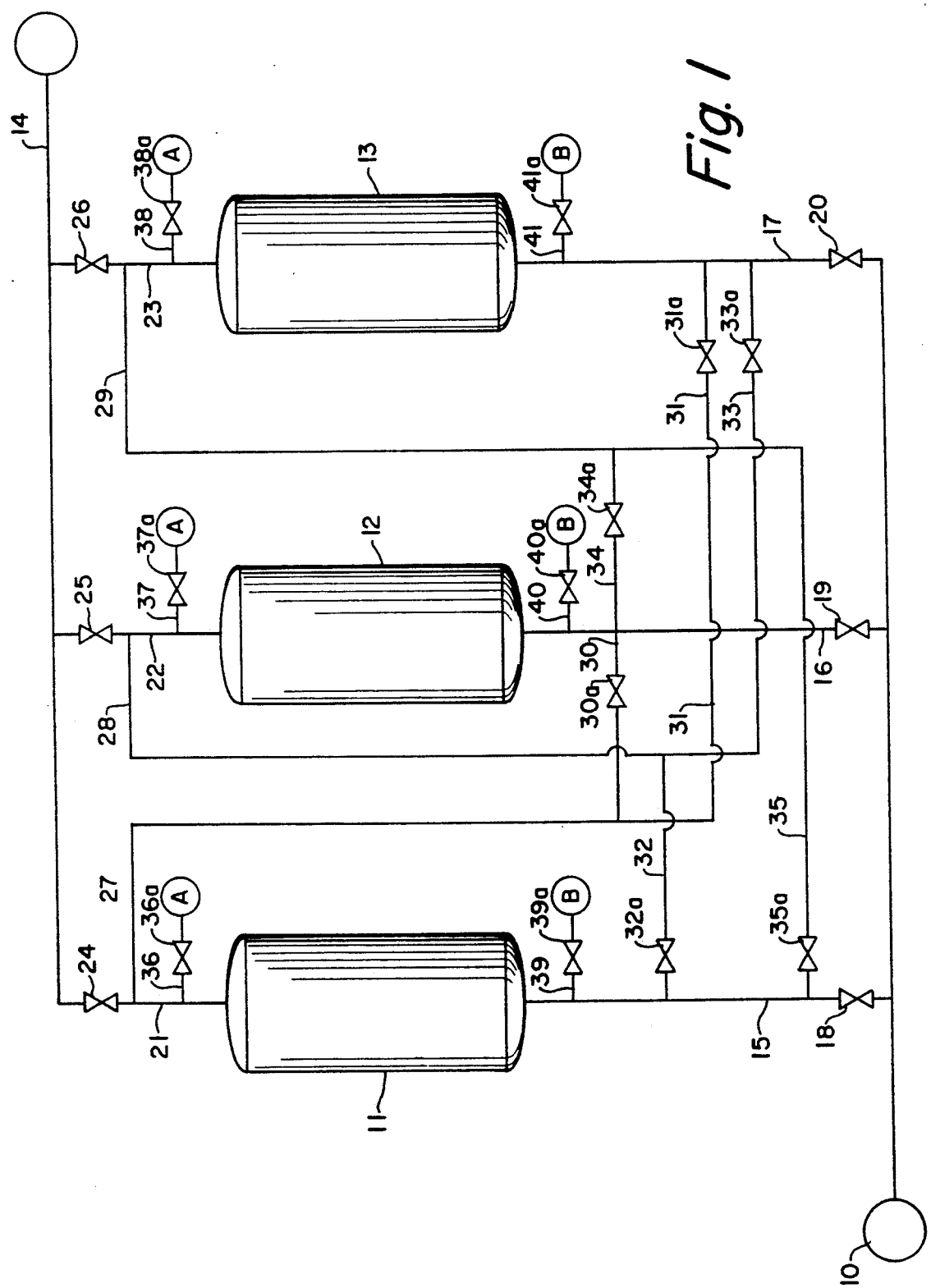
FIG. 1 is a schematic illustration of three vessels containing granular activated carbon for use in removing organic contaminants from a gas stream.

Referring to FIG. 1, there is illustrated a contaminated gas source 10 and three vessels 11,12,13, each containing a bed of particulate activated carbon. Contaminated gas from the source 10 is delivered through one (or more) of the vessels 11,12,13. Clean, low contaminant content gas is exhausted from the vessels 11,12,13 through an exhaust conduit 14. In one embodiment, one of the vessels (e.g., vessel 11) is on-stream and connected to the gas source 10 and the exhaust conduit 14; the other two vessels (12,13) are experiencing regeneration. In another embodiment, two of the vessels (e.g., vessels 11,12) may be on-stream and connected to the gas source 10 in parallel and to the exhaust conduit 14, while the third vessel 13 is experiencing regeneration. In a still further embodiment, two of the vessels (e.g., vessels 11,12) may be connected in series whereby the gas from source 10 passes through a first vessel (e.g., vessel 11) and thence through a second vessel (e.g., vessel 12) and thence to the exhaust conduit 14, while the remaining vessel 13 is experiencing regeneration.

Three vessels have been illustrated in FIG. 1 in an installation. The design of a commercial installation may use a single vessel or multiples of vessels. Where a single vessel is employed, gas treatment is terminated while the single vessel is regenerated.

The three vessels, 11,12,13 of FIG. 1 are each connected to the contaminated gas source 10 by means of conduits 15,16,17 having valves 18,19,20 respectively. Each vessel 11,12,13 is connected to the gas exhaust conduit 14 through conduits 21,22,23, each containing a valve 24,25,26 respectively. Each outlet conduit 21,22,23 has a by-pass conduit 27,28,29 respectively which accommodates serial operation of the vessels 11,12,13. For example, the vessel 11 may have its discharge stream delivered through the conduit 27 and a conduit 30 into the conduit 16 to the vessel 12; alternatively the discharge from the vessel 11 may be delivered through the conduit 27 and a conduit 31 into the conduit 17 to the vessel 13. The exhaust gas from the vessel 12 may be delivered through the conduit 28 and a conduit 32 into the conduit 15 to the vessel 11; alternatively the exhaust gas from vessel 12 may be delivered through conduit 28 and a conduit 33 into the conduit 17 to the vessel 13. Similarly the exhaust gas from the vessel 13 may be delivered through conduit 23 and conduit 29 to a conduit 34 into conduit 16 to vessel 12; alternatively the exhaust gas from vessel 13 may be delivered through conduit 23 and conduit 29 to a conduit 35 into conduit 15 to the vessel 11. It should be noted that appropriate valves 30a,31a,32a,33a,34a and 35a are provided in the conduits 30,31,32,33,34 and 35 respectively.

Figure 2:
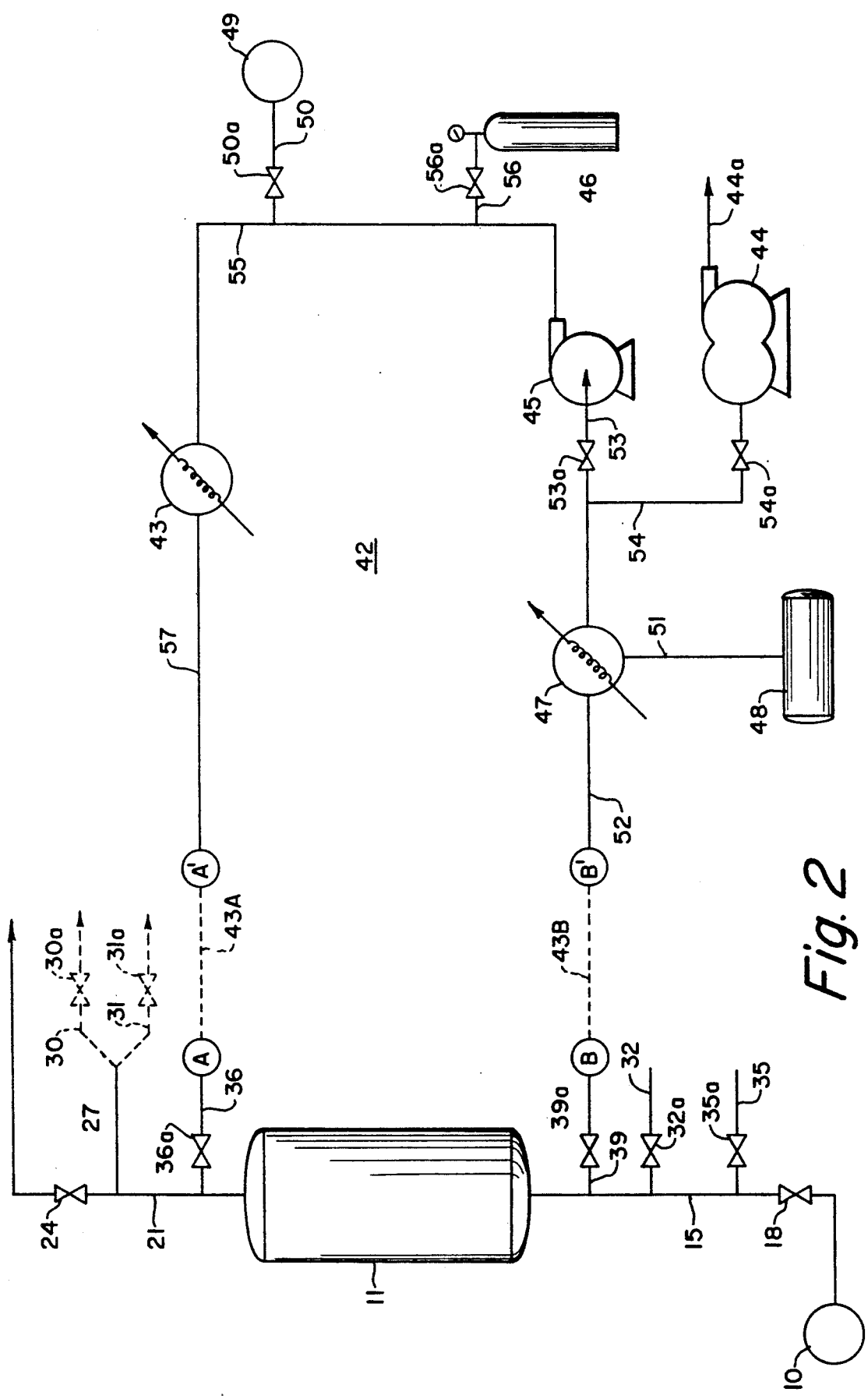
FIG. 2 is a schematic illustration of one of the vessels from FIG. 1 showing peripheral apparatus for regenerating spent activated carbon.

Regeneration conduits 36,37,38 are connected to the vessel conduits 21,22,23 respectively and through valves 36a,37a and 38a respectively to a gas conduit A which is more fully explained in FIG. 2. Similarly regeneration conduits 39,40 and 41 are connected to the vessel conduits 15,16,17 respectively and are also connected through valves 39a,40a,41a respectively to a regeneration conduit B which is more fully explained in FIG. 2.

ONE VESSEL ON-STREAM

If vessel 12 is on-stream, the valves 19 and 25 will be open and valves 30a,32a,33a,34a,37a and 40a will be closed. Concurrently, with respect to vessel 11 which is experiencing regeneration, the valves 18,24,30a,31a,32a and 35a will be closed and the valves 36a,39a will be open. Similarly for the vessel 13 which is experiencing regeneration, the valves 20,26,31a,33a,34a and 35a will be closed and the valves 38a,41a will be open.

PARALLEL OPERATION

If the vessels 12, 13 are operating on-stream in parallel, the valves 19,20,25,26 will be open. The valves 18,24,30a,31a,32a,33a,34a,37a, 38a,40a and 41a will be closed.

SERIAL OPERATION

If the vessels 11, 13 are operating serially with the contaminated gas flowing initially through the vessel 11, the valves 18,31a and 26 will be open. The valves 19,20,24,25,30a,32a,33a,34a,35a,36a,38a,39a and 41a will be closed. In this embodiment, the contaminated gas from source 10 will flow through conduit 15, vessel 11, conduit 21, conduit 27, conduit 31, conduit 17, vessel 13, conduit 23 and exhaust gas conduit 14.

REGENERATION

In FIG. 2 the vessel 11 is illustrated as experiencing regeneration. The valves 36a,39a are open and all of the other valves are closed, namely, 18,24,30a,31a,32a, and 35a. Thus the vessel 11 is connected to the regeneration apparatus indicated generally by the numeral 42 which connects to regeneration conduits A',B'. As indicated by the broken lines 43A,43b, the regeneration conduits A and A' are connected. The regeneration equipment 42 includes a heat exchanger 43, a vacuum pump 44, a gas pump 45, a source 46 of inert gas, a chiller/condenser 47, a liquid condensate collection tank 48 and a source 49 of hot inert gas which may be flue gas, steam or combustion gases.

STAGE I

The vessel 11, prior to regeneration, contains a bed of activated carbon having adsorbed thereon significant quantities of adsorbate, usually a "contaminant". The gas pressure in vessel 11 is reduced by operating the vacuum pump 44. Gas and desorbed contaminants are drawn through conduits B, B' and the chiller/condenser 47. Contaminants are condensed and recovered through conduit 51 and collected in tank 48. Non-condensed gas is vented through the vacuum pump 44 and an exhaust conduit 44a. This preliminary stage removes air (if any) from the vessel 11 prior to the heating state.

During the heating stage of the regeneration cycle inert gases from an inert gas source 46 or 49 are delivered through a conduit 55 and a heat exchanger 43 to the regeneration conduit A' and thence through the regeneration conduit A into the vessel 11 where the inert hot gases increase the temperature of the vessel contents and cause desorption of the contaminants through devolatilization. Hot inert gases containing volatilized contaminants are drawn from the vessel 11 through the conduits 15,39,B and B' by the gas pump 45. The hot inert gases containing contaminants are drawn through the chiller/condenser 47 which lowers the temperature of the inert gas preferably below the dew point of the contained contaminants. The chilled contaminants condense within the chiller/condenser 47 and can be collected as a condensed liquid through a conduit 51 in the condensate collection tank 48. Chilled gases, substantially free of the contaminants, are recovered from the chiller/condenser 47 through a conduit 52 and delivered alternatively to a recycle pump 45 or to a vacuum pump 44 through conduits 53,54 respectively. Valves 53a, 54a are provided in conduits 53,54 respectively. During the heating stage, the valve 53a is open, the valve 54a is closed and the vacuum pump 44 is not in service. The vacuum pump 44 may be connected to other regenerating vessels, not shown in FIG. 2. The chilled inert gas is delivered through the recycle pump 45 through a conduit 55 to the heat exchanger 43. The recycled inert gas is heated in the heat exchanger 43 to a desired temperature and recycled through regeneration conduits A', A to the vessel 11 to continue heating or to maintain the selected regeneration temperature in the vessel 11. Some of the chilled recycle gas may be exhausted through the conduit 54 and valve 54a. Corresponding make-up inert gas may be added to the recycle gas stream from the gas source 49 through the conduit 50 and valve 50a. Additional make-up inert gas from a source 46 may be introduced into the recycle stream conduit 55 through a conduit 56 and valve 56a. Thermal energy may be transferred between heat exchangers, e.g., the chiller/condenser 47 and the heat exchanger 43 to pre-heat or to pre-chill gases for overall energy conservation.

Figure 6:
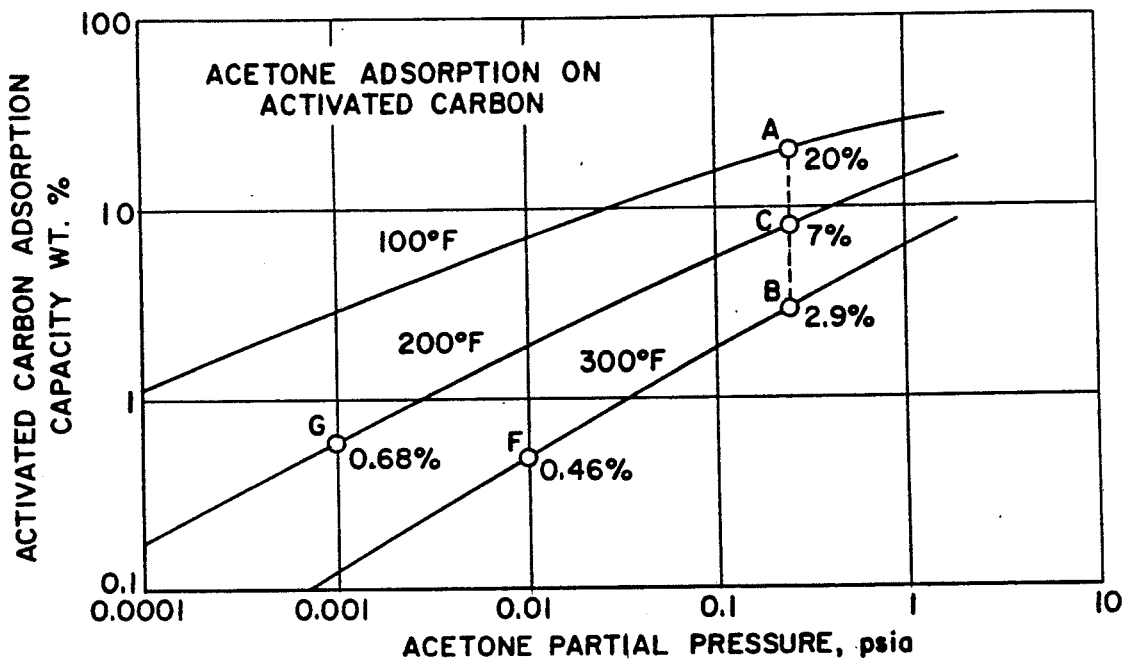
FIG. 6 is a graphical presentation showing the adsorption capacity (weight percent) of activated carbon for acetone according to the partial pressure of acetone in the vessel at three temperatures.
Figure 7:
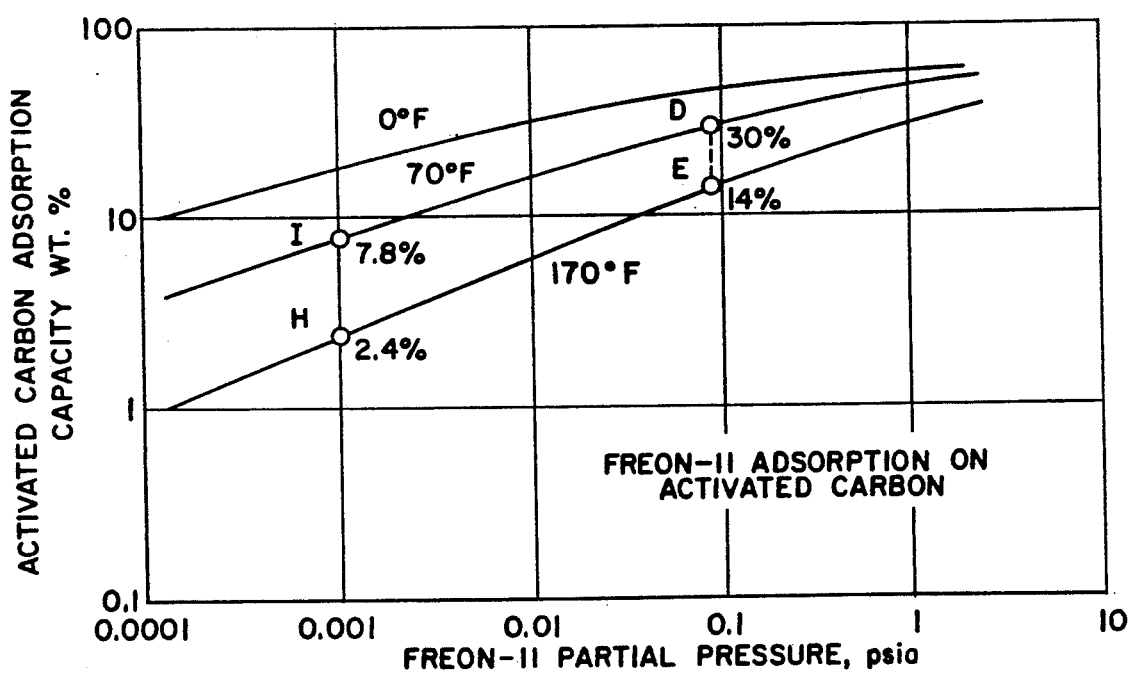

The described heating and movement of recycled inert gas through the vessel 11 continues until the desired temperature, at least 225° F., is achieved and maintained within the vessel 11. Typically the activated carbon bed in the vessel 11 will be heated to a selected temperature in the range of 225°–600° Fahrenheit. The exact temperature will depend upon the desired level of regeneration and the specific adsorbates on the activated carbon. Two typical adsorption capacity charts are provided as log-log plots in FIG. 6 and 7. FIG. 6 shows the adsorption capacity of acetone on activated carbon. It will be seen that activated carbon containing 20 percent by weight acetone at 100° F. presents a partial pressure of 0.25 psi (point A, FIG. 6). If the temperature increases at the same pressure to 300° F., the acetone will constitute only about 1.3 weight percent of the activated carbon (point B, FIG. 6). At 200° F. at the same pressure, the acetone will comprise about 7 percent of the weight of the activated carbon (point C, FIG. 6). Thus it can be seen that elevating the temperature of the activated carbon bed will cause substantial desorption of acetone. The same principle applies to other adsorbates.

VACUUM STAGE

After the vessel 11, FIG. 2, has achieved the desired temperature for the desired time, the heating stage is terminated and the vacuum stage commences without deliberate cooling of the activated carbon bed. The valves 36a, 50a, 53a and 56a are closed. The valves 54a and 39a are opened. The vessel 11 thus is connected directly to the vacuum pump 44 through the conduits 15,39,B, and B', the chiller/condenser 47, conduits 52 and 54. The resident gases, principally inert gas, from the interior of the vessel 11 are chilled in the chiller/condenser 47 causing the contaminant to condense for collection in the condensate collector vessel 48. The contaminant-depleted inert gas from the chiller/condenser 47 passes through the conduits 52,54 and is exhausted through the vacuum pump 44 and exhaust conduit 44a. The vacuum stage continues until the subatmospheric pressure within the vessel 11 achieves a pre-determined level below 0.01 Torr. As the adsorbate is volatilized during the vacuum stage, the latent heat for adsorbate volatilization is supplied from the sensible heat of the activated carbon causing the bed temperature to drop.

The reduced pressure in the vessel 11 during the vacuum stage lowers the amount of adsorbed contaminant in the activated carbon bed. For acetone, the amount of acetone at 0.01 psi partial pressure and 300° F. is 0.46% (point F, FIG. 6). At 0.001 psi partial pressure and 200° F., the amount of acetone is 0.68% (point G, FIG. 6).

It should be noted that by constantly encouraging removal of vaporized adsorbate from the adsorbent, the vacuum pump 44 performs a function which is similar a large flow of purge gas. That is, the vacuum pump depletes the absolute pressure of the vaporous materials and thus promotes substantial additional adsorbate vaporization by unbalancing the ratio of adsorbed:-desorbed adsorbate. In addition, when compared with the use of steam or other purge gas for regeneration, the vacuum pump 44 offers a substantial benefit by removing the adsorbate in an undiluted form in a gaseous stream of comparatively small volume.

The vacuum stage is ended when the regeneration has proceeded to the desired extent. The resulting regenerated activated carbon may not be as efficient as virgin activated carbon and may not have the full adsorption capacity of virgin activated carbon, but is superior to regenerated activated carbon resulting from prior art regeneration procedures. Repeated cycling of the activated carbon through a heating stage and a vacuum stage can restore the activated carbon to near-virgin quality.

A preferred installation is illustrated in FIG. 1 including three vessels 11, 12, 13. The incoming gas stream from the source 10 passes sequentially through two of the vessels, e.g., vessel 11 and then vessel 12. Substantially contaminant-free exhaust gas is recovered from the exhaust gas conduit 14. The initial vessel 11 will approach adsorption capacity initially because the activated carbon in the initial vessel 11 will adsorb most of the contaminants from the source 10, i.e., the gas stream in conduits 21, 27, 30, 16 will have a significantly lower contaminant content than the contaminated gas from the source 10. When the activated carbon in the vessel 11 reaches the established adsorbent capacity, the gas stream flow is shifted to vessel 12 as the initial vessel and to vessel 13 as the sequential vessel. The vessel 13 contains regenerated activated carbon of near-virgin quality. At this time the vessel 11 is subjected to the regeneration stage. When the vessel 12 reaches its established adsorbent capacity, another cycle is commenced with the gases from the source 10 passing initially through the vessel 13 and thereafter through the vessel 11, which then contains regenerated activated carbon of near-virgin quality. During this cycle, the vessel 12 is in the regeneration stage.

The duration of each cycle will depend upon the size of the activated carbon beds in vessels 11,12,13 and upon the concentration of the contaminants in the gas source 10. The present system is intended for use with low contaminant streams such as streams containing about one percent or less of the organic contaminant (by volume) which is to be removed. In the sequential treatment, the gas stream exits from the system through a vessel which has been most recently regenerated and which contains activated carbon of near-virgin quality so that the adsorption efficiency of the activated carbon is high.

Figure 3:
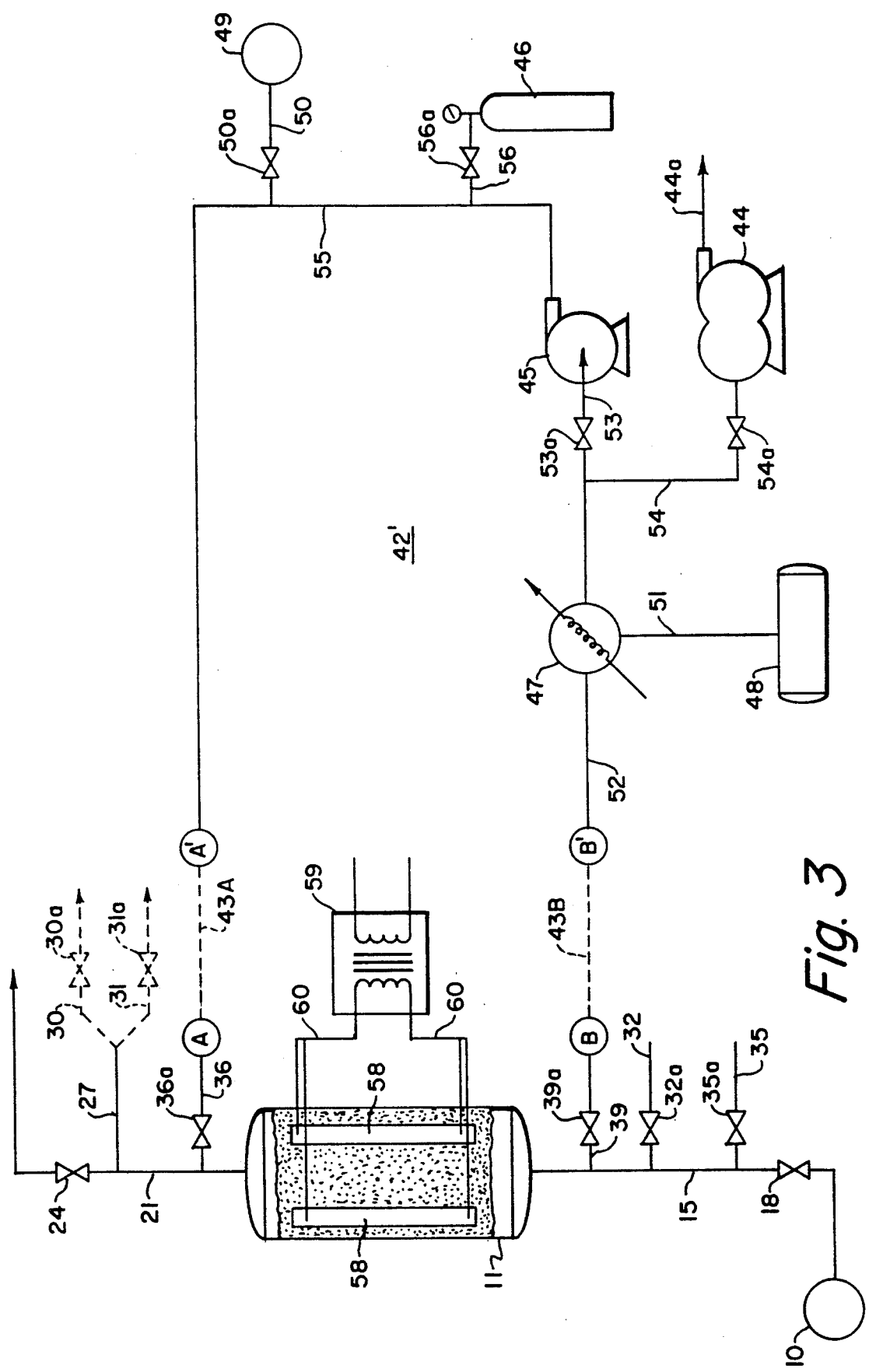
FIG. 3 is a schematic view of an alternative embodiment of the peripheral apparatus of FIG. 2.

A variety of means for heating the activated carbon bed during regeneration are available. As shown in FIG. 2, the recycled gases may be heated in a heat exchanger 43 which typically will contain steam, flue gas, hot water, hot oil or electrically-heated coils as a source of heat. The hot gases in the regeneration conduit A' surrender their sensible heat to the activated carbon bed in the vessel 11. Alternative embodiments in FIGS. 3,4,5 eliminate the heat exchanger (43 of FIG. 2) and instead provide for internal heating of the activated carbon bed. In FIG. 3 one or more electrical resistance heating elements 58 are mounted within the vessel 11. The electrical heating elements 58 are connected to a transformer 59 by electrical conductors 60. In order to heat the contents of the vessel 11, the transformer 59 is activated and electrical energy is converted to heat inside the vessel 11. The vessel 11 should contain inert gas during the heating phase to avoid oxidation and possible explosion. The inert gas may be recycled continuously through the chiller 47 and recycle pump 45. Alternatively the inert gas may be maintained within the vessel 11 until the desired temperature has been achieved. Thereafter the inert gas may be recycled through the vessel 11, chiller 47 and recycle pump 45.

Figure 4:
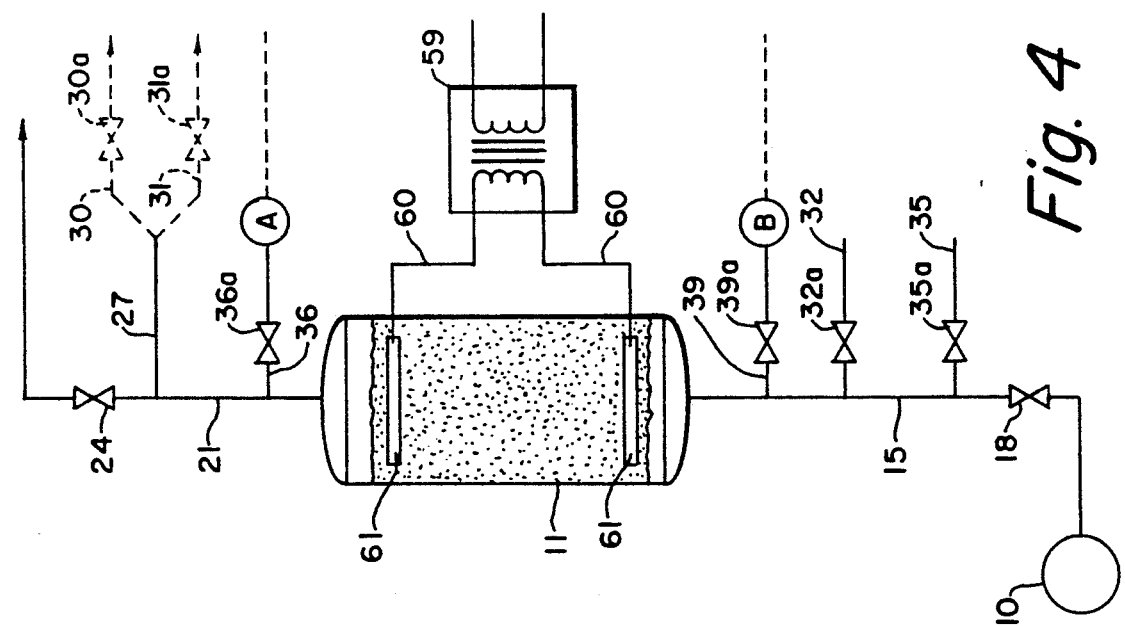

FIG. 4 illustrates an embodiment of the invention requiring a special activated carbon material which contains electrically conductive materials such as iron filings, iron oxide or other metals which conduct electricity, and which are dispersed throughout the activated carbon bed. The conductors may be discrete particles, distinct from the activated carbon particles. Alternatively the activated carbon may contain as a homogeneous dispersion within each activated carbon particle an appropriate quantity of the electrically conductive material. In the embodiment of FIG. 4, the electrical energy can be delivered through the activated carbon bed between a pair of electrodes 61 which are connected to a transformer 59 by means of conductors 60. This embodiment uses the electrical resistivity of the bed to generate the necessary heat. This form of indirect heating avoids the need for multiple electrical resistance heaters of the type illustrated in FIG. 3 as elements 58.

Figure 5:
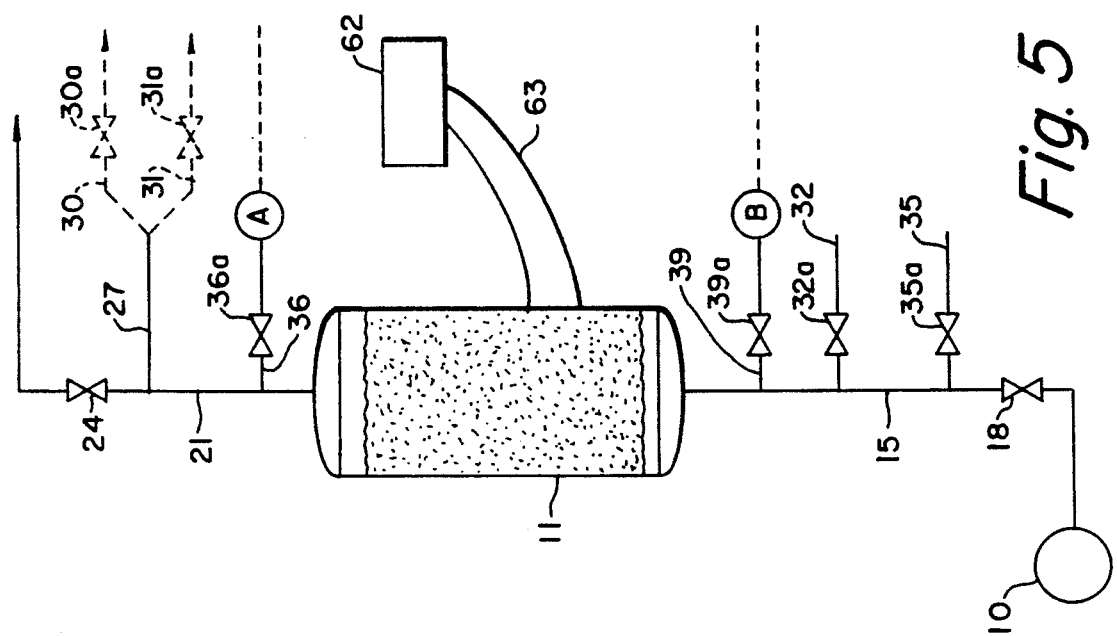
FIGS. 4 and 5 are schematic illustrations of alternative embodiments of an activated carbon vessel of the type illustrated in FIG. 1.

In FIG. 5 a microwave generator 62 provides electromagnetic waves which can be delivered to the vessel 11 through an appropriate wave guide 63. The contents of the vessel 11 are thus heated by microwave energy. Procedures for microwave heating materials are described in U.S. Pat. No. 4,103,431.

Throughout the specification, the term "inert gas" is intended to identify any gas stream which is substantially free of oxidants and substantially free of any gaseous ingredients which will chemically react with activated carbon or the materials which are adsorbed on the activated carbon or the materials of construction of the vessels, conduits and other processing components. A preferred inert gas is nitrogen which can be supplied from gas tanks, e.g., the tank 46 illustrated in FIG. 2. Alternatively the inert gas may be carbon dioxide. Flue gases from combustion installations such as furnaces or burners are acceptable inert gas and may be supplied from a source 49 as hot gas.

OPERATION WITH LIQUIDS

While the examples in this specification have illustrated the treatment of gases to remove contaminants, the regeneration procedure is effective for treating spent activated carbon, regardless of whether the removal system treats liquids or gases. The spent carbon should be dried by passing warm gas through the wet bed prior to commencing the regeneration cycle.

EXAMPLE

Assume a gas stream containing 3,000 ppm benzene at a temperature of 100° F. The total benzene content is 1230 pounds per day. Two vessels, each containing about 3000 pounds of activated carbon can accomplish the recovery requirement.

In order to regenerate a vessel, a vacuum is applied to remove air from the system for about one-half hour. The system is refilled with nitrogen gas, approximately 400 cubic feet. The nitrogen gas is heated to 325° F. and recycled through the unit for about one-and-one-half hours until the unit reaches a temperature of about 225° F. The nitrogen recycle rate is approximately 1500 cubic feet per minute or about 80 pounds nitrogen gas per minute.

A chiller is operated to condense the benzene for about one-half hour. Thereafter the vessel is closed while the activated carbon remains at the elevated temperature. Residual gas is withdrawn from the vessel through a chiller and vacuum pump. The pressure within the vessel is rapidly reduced to less than 0.01 Torr. The carbon is cooled as a result of the devolatilization of benzene. The total regeneration procedure requires about 3.25 to 4 hours, i.e., the thermal regeneration stage and the vacuum regeneration stage.

OFF-SITE OPERATION

The examples illustrate regeneration on-site. Under some circumstances, it may be desirable to disconnect a vessel which requires regeneration and to transport the vessel or the spent activated carbon to an off-site location containing the equipment illustrated in FIG. 2. After regeneration, the vessel is returned to the operating site. This procedure is of especial value when the adsorption cycle is long, e.g., more than about a week.

We claim:

1. The method for regenerating a bed of particulate activated carbon in a container having an inlet conduit and an outlet conduit, said particulate activated carbon having adsorbed thereon an adsorbate which lowers the adsorbing efficiency of said particulate adsorbent, comprising:
   A. Heating said bed to an elevated temperature above 225° F. at which said adsorbate has a vapor pressure which is greater than the adsorbate vapor pressure of said adsorbate at ambient temperature;
   B. Passing inert gas through the heated bed to entrain volatilized adsorbate until the residual adsorbate in said bed is reduced to a first weight percentage; recovering a first gaseous mixture from said container including said inert gas and said volatilized adsorbate;
   C. Chilling said first gaseous mixture whereby said adsorbate is separated from said inert gas;
   D. While said bed remains at said elevated temperature, closing said inlet conduit and, without deliberate cooling of said bed, connecting said outlet conduit through said chiller to a vacuum source to reduce the pressure within said container to less than 0.01 Torr and withdrawing through said outlet conduit a second gaseous mixture containing residual inert gas and devolatilized adsorbate;
   E. Passing said second gaseous mixture through said chiller to separate adsorbate as a liquid from chilled residual inert gas;
   F. Discharging said chilled residual inert gas;
   G. Continuing to withdraw said second gaseous mixture until the residual adsorbate content of said bed is less than a pre-established content and said bed has developed a lowered temperature as a result of the cooling achieved by volatilization of adsorbate from said bed.

2. The method of claim 1 wherein at least a portion of said inert gas from said first gaseous mixture is recycled through said container.

3. The method of claim 1 wherein said bed is heated by passing hot inert gases through said container.

4. The method of claim 3 wherein said hot gases are at least in part heated recycled inert gas from said first gaseous stream.

5. The method of claim 1 wherein said bed is heated by directing electric current through resistance heating elements in said bed.

6. The method of claim 5 wherein said resistance heating elements are particles of electric-conducting material within said bed.

7. The method of claim 1 wherein said inert gas is nitrogen or carbon dioxide.

8. The method of claim 1 wherein said inert gas is a gas stream which is substantially free of oxidants and substantially free of any gaseous ingredients which will chemically react with activated carbon or the materials which are adsorbed on the activated carbon or the materials of construction of the vessels, conduits, and other processing components.

* * * * *